United States Patent [19]

Engelhardt et al.

[11] 4,357,245

[45] Nov. 2, 1982

[54] WATER-SOLUBLE COPOLYMER AND ITS PREPARATION

[75] Inventors: Friedrich Engelhardt; Ulrich Riegel, both of Frankfurt am Main; Martin Hille, Liederbach; Heinz Wittkus, Frankfurt am Main, all of Fed. Rep. of Germany

[73] Assignee: Cassella Aktiengesellschaft, Frankfurt, Fed. Rep. of Germany

[21] Appl. No.: 297,237

[22] Filed: Aug. 28, 1981

Related U.S. Application Data

[62] Division of Ser. No. 174,731, Aug. 1, 1980, Pat. No. 4,309,523.

[30] Foreign Application Priority Data

Aug. 6, 1979 [DE] Fed. Rep. of Germany ....... 2931897

[51] Int. Cl.$^3$ ............................................... C09K 7/02
[52] U.S. Cl. ............................ 252/8.5 C; 252/8.5 A
[58] Field of Search ............................... 326/240, 287; 252/8.5 A, 8.5 C

[56] References Cited

U.S. PATENT DOCUMENTS

| | | | |
|---|---|---|---|
| 2,775,557 | 12/1956 | Morgan | 252/8.5 |
| 3,296,126 | 1/1967 | Diener et al. | 252/8.5 |
| 3,402,222 | 9/1968 | Zutty et al. | 525/223 X |
| 3,692,673 | 9/1972 | Hoke | 526/287 X |
| 4,048,077 | 9/1977 | Engelhardt et al. | 252/8.5 |
| 4,293,427 | 10/1981 | Lucas et al. | 252/8.5 |

*Primary Examiner*—Herbert B. Guynn

*Attorney, Agent, or Firm*—Connolly and Hutz

[57] ABSTRACT

Outstandingly suitable drilling mud additives are water soluble copolymers consisting essentially of a random distribution of (a) 5 to 95% by weight of units of the formula

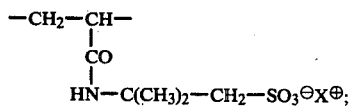

(b) 5 to 95% by weight of units of the formula

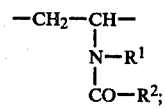

and (c) 0 to 80% by weight of units of the formula

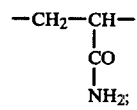

wherein $R^1$ and $R^2$ are the same or different and each is hydrogen methyl or ethyl; and $X^\oplus$ is a cation.

2 Claims, No Drawings

WATER-SOLUBLE COPOLYMER AND ITS PREPARATION

This application is a division of application Ser. No. 174,731, filed Aug. 1, 1980, now U.S. Pat. No. 4,309,523.

The present invention relates to a new water-soluble copolymer which consists, in random distribution, of radicals of the formula I $$-CH_2-CH- \atop \underset{HN-C(CH_3)_2-CH_2-SO_3^{\ominus}X^{\oplus}}{|\atop CO}$$  (I)

to the extent of 5 to 95% by weight, of radicals of the formula II $$-CH_2-CH- \atop \underset{CO-R^2}{|\atop N-R^1}$$  (II)

to the extent of 5 to 95% by weight, and of radicals of the formula III $$-CH_2-CH- \atop \underset{NH_2}{|\atop C=O}$$  (III)

to the extent of 0 to 80% by weight, wherein $R^1$ and $R^2$ are identical or different and denote hydrogen, methyl or ethyl and $X^{\oplus}$ denotes a cation, and to its preparation. The copolymer according to the invention is outstandingly suitable as a drilling mud additive.

Particularly valuable copolymers according to the invention consist, in random distribution, of radicals of the formula I to the extent of 40–80% by weight, of radicals of the formula II to the extent of 10–30% by weight and of radicals of the formula III to the extent of 0–60% by weight.

In principle, the cation $X^{\oplus}$ can be derived from any known water-soluble base which is sufficiently strong to neutralise the sulpho groups of the copolymers according to the invention and which does not impair the water-solubility of the copolymers. The cation can thus be selected in a simple known manner.

However, $X^{\oplus}$ preferably denotes an alkali metal cation, in particular a sodium cation or potassium cation, or a cation of the formula $HN^{\oplus}R_3^3$, wherein the three radicals $R^3$ are identical or different and represent hydrogen, alkyl with 1 to 4 C atoms or hydroxyethyl.

If the products are to be used as auxiliaries for solids-free drilling, $X^{\oplus}$ is as a rule preferably a sodium cation or potassium cation.

The preparation of water-soluble polymers which contain sulphonic acid groups incorporated in the macromolecule has already been described in detail in numerous patents and in the technical literature. Thus, for example, the synthesis of copolymers of vinylsulphonic acid with acrylamide and vinylpyrrolidone has been published in J. Polymer Sci., 38, 147 (1959).

A process for the preparation of water-soluble copolymers of vinylsulphonic acid and acrylonitrile or methacrylonitrile, optionally in a mixture with other ethylenically unsaturated compounds, has been described in German Pat. No. 1,101,760. Copolymers of vinylsulphonates or alkylsulphonates with acrylamide and vinylamides have been described, for example, in German Auslegeschrift No. 2,444,108.

Water-soluble copolymers which contain 2-acrylamido-2-methyl-propane-3-sulphonic acid, abbreviated to AMPS in the following text, as the comonomer are described in U.S. Pat. Nos. 3,953,342 and 3,768,565, German Offenlegungsschriften Nos. 2,502,012 and 2,547,773 and U.S. Pat. Nos. 3,907,927, 3,926,718 and 3,948,783. Thus, copolymers of vinylpyrrolidone and AMPS can be prepared, for example, according to the statements of U.S. Pat. No. 3,929,741, Example 10.

However, if the copolymerisation of AMPS with non-cyclic N-vinylamides of the general formula $$CH_2=CH-\underset{|}{N}-COR^2 \atop R^1$$

is carried out under analogous conditions, no polymerisation to give water-soluble products takes place.

It was thus not possible to prepare the new water-soluble copolymers according to the invention which contain both copolymerised AMPS and copolymerised non-cyclic N-vinylacylamides by the known methods.

However, the water-soluble copolymers according to the invention can successfully be prepared if, for the preparation of every 100 parts by weight of the copolymer, 5 to 95 parts by weight of 2-acrylamido-2-methyl-propane-3-sulphonic acid of the formula Ia $$CH_2=CH-CO-NH-C(CH_3)_2-CH_2-SO_3H \quad (Ia)$$

are dissolved in water or a water-miscible organic solvent, the sulphonic acid is neutralised by adding a base, 5 to 95 parts by weight of a vinylacylamide of the formula IIa $$CH_2=CH-\underset{|}{N}-CO-R^2 \atop R^1 \qquad (IIa)$$

wherein $R^1$ and $R^2$ are identical or different and denote hydrogen, methyl or ethyl, and if appropriate 0 to 80 parts by weight of acrylamide are then added and the copolymerisation is initiated, and carried out at 10° to 120° C., in a manner which is in itself known.

Preferred copolymers according to the invention are obtained if 30–70 parts by weight of 2-acrylamido-2-methyl-propane-3-sulphonic acid of the formula Ia, 10–30 parts by weight of the vinylacylamide of the formula IIa and, if appropriate, 0–60 parts by weight of acrylamide are employed for the preparation of every 100 parts by weight of the copolymer.

Possible water-miscible organic solvents which are suitable for carrying out the preparation process according to the invention are, in particular, water-soluble alkanols, in particular those with 1 to 4 C atoms, such as methanol, ethanol, propanol, isopropanol and n-, sec.- or iso-butanol, but preferably tert.-butanol.

The water content of the lower alkanols employed as the solvent should not exceed 6% by weight, since otherwise lumps may be formed during the polymerisation. The polymerisation is preferably carried out at a water content of 0–3%.

The amount of solvent to be employed depends to a certain extent on the nature of the comonomers employed.

As a rule, 200 to 1,000 g of the solvent are employed per 100 g of total monomers.

The base employed for neutralising the 2-acrylamido-2-methyl-propane-3-sulphonic acid is appropriately chosen such that it supplies the desired cation $X^\oplus$. An alkali metal salt of a weak acid, an alkali metal hydroxide or a compound of the formula $NR_3^3$, wherein the three radicals $R^3$ are identical or different and represent hydrogen, alkyl with 1 to 4 C atoms or hydroxyethyl, is thus usually employed as the base.

A sodium salt or potassium salt of a weak acid, sodium hydroxide or potassium hydroxide is as a rule the preferred base if the products are to be used as auxiliaries for solids-free drilling.

As is customary, the polymerisation is carried out in an inert gas atmosphere, preferably under nitrogen. The polymerisation temperature is between 20° and 120° C., and is preferably 40° to 80° C.

High-energy electromagnetic rays or the customary polymerisation initiators can be used to trigger off the polymerisation, examples of customary polymerisation initiators being organic peroxides, such as benzoyl peroxide, tert.-butyl hydroperoxide, methyl ethyl ketone-peroxide and cumene hydroperoxide, azo compounds, such as azo-di-iso-butyronitrile, and inorganic peroxy compounds, such as $(NH_4)_2S_2O_8$ or $K_2S_2O_8$, or $H_2O_2$, if appropriate in combination with reducing agents, such as sodium bisulphite, or redox systems which contain, as the reducing component, aliphatic or aromatic sulphinic acids, such as benzenesulphinic and toluenesulphinic acid or derivatives of these acids, such as, for example, Mannich adducts of sulphinic acids, aldehydes and amino compounds, such as are described in German Patent Specification No. 1,301,566. As a rule, 0.05 to 2 g of the polymerisation initiator are employed per 100 g of the total monomers.

If water is used as the solvent for carrying out the preparation process according to the invention, the polymerisation proceeds under the conditions of solution polymerisation, and a viscous aqueous solution of the copolymer according to the invention is obtained, from which the product can be isolated by distilling off the water or by precipitation by mixing the solution with a water-miscible organic solvent, such as methanol, ethanol, acetone and the like. However, the resulting aqueous solution is preferably put to use in the intended manner directly, if necessary after adjusting to a desired concentration.

If the organic solvents mentioned, preferably tert.-butanol, are used for the copolymerisation, the reaction is carried out under the conditions of precipitation polymerisation. In this case, the polymer is obtained directly in solid form and can be isolated by the distilling off the solvent or by filtration and drying.

The copolymers according to the invention are outstandingly suitable as auxiliaries in drilling muds. They exhibit a very good protective colloidal action both at high temperatures and at high electrolyte concentrations, and are considerably superior to the nearest comparable drilling mud additives known from U.S. Pat. No. 2,775,557 and German Patent Specification Nos. 1,300,481 and 2,444,108, especially in respect of their stability to electrolytes and resistance to ageing.

The copolymers according to the invention are employed in concentrations of 0.5 to 40 kg/m$^3$, preferably 3-30 kg/m$^3$, for the formulation of aqueous drilling muds. To increase the viscosity and to seal drilled formations, the aqueous drilling muds predominantly contain bentonites. Barite, chalk and iron oxides are added to increase the density of the drilling sludges.

Bentonite, barite, chalk and iron oxide can be added to the drilling muds by themselves or as mixtures in the most diverse proportions. The factors determining the maximum limit are the rheological properties of the drilling muds.

The preparation of the polymers according to the invention is illustrated by the following examples.

EXAMPLE 1

600 ml of tert.-butanol are initially introduced into a polymerisation flask which has a capacity of 2 l and is provided with a stirrer, reflux condenser, dropping funnel, gas inlet tube and electrically heated waterbath, 65 g of AMPS are suspended in the tert.-butanol, whilst stirring, 7.1 l of $NH_3$ gas are then passed in and 15 g of acrylamide and 20 g of N-vinyl-N-methylacetamide are subsequently added. The reaction mixture is heated to 50° C. with the electric waterbath, whilst passing in nitrogen, and 1.0 g of azobisisobutyronitrile are added. After an induction time of about 2 hours, the polymerisation starts, the reaction temperature increases up to 69° C. and the polymer precipitates. Heating is continued at 80° C. for 2 hours, whereupon a viscous suspension is formed. The polymer can be isolated by filtration, and drying in vacuo at 50° C. However, it is also possible to distil off the solvent directly from the reaction mixture under reduced pressure. The polymer is obtained in the form of a white light powder which is readily soluble in water. K value according to Fikentscher: 170.

The copolymers of Table I can also be prepared by this procedure.

In Tables I and II, the abbreviations have the following meanings:
AM: acrylamide
VMA: N-vinyl-N-methyl-acetamide
AMPS: 2-acrylamido-2-methyl-propane-3-sulphonic acid, wherein the superscript
  1 denotes the NH$_4$ salt
  2 denotes the dimethyl-$\beta$-hydroxyethylammonium salt
  3 denotes the K salt
  4 denotes the Na salt
VA: vinylacetamide
VF: vinylformamide In the "catalysts" column, the abbreviations are as follows:
A: ammonium peroxydisulphate
B: ammonium peroxydisulphate+dibutylammonium chloride+

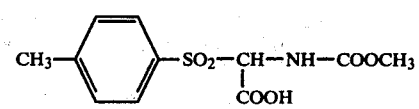

C: azobisisobutyronitrile.

TABLE I

| No. | K value | Monomer composition AM | VMA | AMPS | VA | VF | Further additives (relative to the total monomers) | Catalysts | Reaction medium |
|---|---|---|---|---|---|---|---|---|---|
| 2 | 210 | 15 | 20 | 65[1] | | | | C | tert.-Butanol |
| 3 | 192 | 15 | 30 | 55[1] | | | | " | " |
| 4 | 153 | 65 | 30 | 5[1] | | | | " | " |
| 5 | 163 | 60 | 30 | 10[1] | | | | " | " |
| 6 | 184 | 55 | 30 | 15[1] | | | | " | " |
| 7 | 159 | 55 | 40 | 5[1] | | | | " | " |
| 8 | 171 | 50 | 40 | 10[1] | | | | " | " |
| 9 | 180 | 45 | 40 | 15[1] | | | | " | " |
| 10 | 166 | 45 | 40 | 15[1] | | | | " | " |
| 11 | >100 | 15 | 20 | 65[2] | | | | " | " |
| 12 | 168 | 15 | 20 | 65[1] | | | | " | " |
| 13 | 495 | 55 | 40 | 5[1] | | | 0,5% of allyl-sugar ether | " | " |
| 14 | ~520 | 15 | 20 | 65[1] | | | 0,5% of allyl-sugar ether | " | " |
| 15 | — | 15 | 20 | 65[1] | | | 2% of stearylpropylenediamine | " | " |
| 16 | 203 | 25 | 20 | 55[1] | | | | " | " |
| 17 | 211 | 22.7 | 27.3 | 50[1] | | | | " | " |
| 18 | 207.5 | 15 | 40 | 45[1] | | | | " | " |
| 19 | 204.5 | 25 | 30 | 45[1] | | | | " | " |
| 20 | 209 | 35 | 20 | 45[1] | | | | " | " |
| 21 | 205.5 | 35 | 30 | 35[1] | | | | " | " |
| 22 | 206 | 25 | 40 | 35[1] | | | | " | " |
| 23 | 199 | 15 | 50 | 35[1] | | | | " | " |
| 24 | 199 | 45 | 20 | 35[1] | | | | " | " |
| 25 | 202 | | 35 | 65[1] | | | | " | " |
| 26 | 192 | | 50 | 50[1] | | | | " | " |
| 27 | 190 | | 20 | 80[1] | | | | " | " |
| 28 | 163 | | | 100[1] | | | | " | " |
| 29 | 177 | | 10 | 90[1] | | | | " | " |
| 30 | 177 | 10 | | 90[1] | | | | " | " |
| 31 | 215 | 35 | | 65[1] | | | | " | " |
| 32 | 208 | 50 | | 50[1] | | | | " | " |
| 33 | 201 | 20 | | 80[1] | | | | " | " |
| 34 | 191 | 15 | | 65[1] | 20 | | | " | " |
| 35 | 202 | 15 | | 65[1] | | 20 | | " | " |
| 36 | 219 | | | 65[1] | 35 | | | " | " |
| 37 | 194 | | | 65[1] | | 35 | | " | " |

EXAMPLE 38

200 ml of deionised water are initially introduced into the apparatus described in Example 1, 28 ml of aqueous 25% strength ammonia solution are added, 65 g of AMPS are then introduced, whilst stirring and passing in a weak stream of N₂, and, after a clear solution has formed, 15 g of acrylamide and 20 g of N-vinyl-N-methylacetamide are also added. The pH value of the solution is 8.0. The polymerisation is initiated at 23° C. by adding 10 ml of a 0.5% strength aqueous ammonium peroxydisulphate solution. After an induction period of about 40 minutes, polymerisation starts, the temperature rises up to 42° C. and the reaction mixture becomes viscous. Heating is continued for a further 2 hours at 80° C.

A clear, highly viscous solution which has a K value according to Fikentscher of 250 and can be put directly to use as a drilling mud additive is obtained.

The copolymers summarised in the following table can also be synthesised in an analogous manner.

TABLE II

| No. | K value | Monomer composition AM | VMA | AMPS | VA | VF | Catalysts | Reaction medium |
|---|---|---|---|---|---|---|---|---|
| 39 | 241 | | | 100[3] | | | A | Water |
| 40 | about 50 | | | 12.5[3] | | | H₂O₂ | " |
| 41 | >100 | 65 | 30 | 5[4] | | | B | " |
| 42 | >100 | 60 | 30 | 10[4] | | | " | " |
| 43 | >100 | 55 | 30 | 15[4] | | | " | " |
| 44 | 265.5 | 15 | 20 | 65[1] | | | A | " |
| 45 | 504 | 15 | 20 | 65[1] | | | C | " |
| 46 | 509 | 15 | 20 | 65[1] | | | C | " |
| 47 | 498 | 15 | 20 | 65[1] | | | A | " |
| 48 | 223 | | 50 | 50[1] | | | C | " |
| 49 | 232 | | 45.5 | 54.5[1] | | | C | " |
| 50 | 192 | | 10 | 90[1] | | | H₂O₂ | " |
| 51 | 137.5 | 10 | | 90[1] | | | H₂O₂ | " |
| 52 | 100 | 35 | | 65[1] | | | H₂O₂ | " |
| 53 | 142.5 | | 35 | 65[1] | | | H₂O₂ | " |
| 54 | 160 | 50 | | 50[1] | | | " | " |
| 55 | 120 | | 50 | 50[1] | | | " | " |
| 56 | 144.5 | 20 | | 80[1] | | | " | " |
| 57 | 135.5 | | 20 | 80[1] | | | " | " |
| 58 | 363 | | | 58.3[1] | 41.7 | | C | " |

TABLE II-continued

| No. | K value | Monomer composition | | | | | Catalysts | Reaction medium |
| | | AM | VMA | AMPS | VA | VF | | |
| --- | --- | --- | --- | --- | --- | --- | --- | --- |
| 59 | 390 | | | 62.6[1] | | 37.4 | C | " |

In the examples which follow, copolymers according to the invention are compared with known drilling mud additives in various drilling muds at normal temperature and after ageing at 200° C. for 15 hours.

The filterability, according to American Petroleum Industry Code 29, of the drilling sludges produced with various additives serves as a measure of their stability. The quality of the drilling sludges and thus the effect of the additives is evaluated by the "water loss" in the filtration test. By water loss in this context there is to be understood the amount of water which passes through a given filter press in a certain unit of time (30 minutes) under a certain predetermined pressure (7 kg/cm$^2$). The smaller the amount of water passing through, the better is the stability of the drilling mud. The tests are carried out room temperature.

The following additives were used for the investigations:

A. Copolymer (according to the invention) consisting of 65% of AMPS, 20% of N-vinyl-N-methylacetamide and 15% of acrylamide B. Copolymer (according to the invention) consisting of 80% of AMPS and 20% of N-vinyl-N-methylacetamide C. Copolymer consisting of sodium acrylate and acrylamide according to U.S. Pat. No. 2,775,557, Example 2, product no. 5 (comparison product)

D. Copolymer consisting of 45% of sodium vinylsulphonate and 55% of N-vinyl-N-methylacetamide according to German Patent Specification No. 1,300,481

E. Copolymer consisting of 20% of sodium vinylsulphonate, 70% of acrylamide and 15% of N-vinylpyrrolidone according to German Auslegeschrift No. 2,444,108.

TEST CONDITIONS

Example 1

In each case 1% of the additives A to E are added to samples of drilling muds containing 4% of bentonite and water which is virtually free from electrolytes, and of a drilling sludge containing 25% of sodium chloride and 1% of gypsum. Without the additive, the drilling mud which is virtually free from electrolytes has a water loss of 24 cm$^3$ and the drilling sludge containing 25% of sodium chloride and 1% of gypsum has a water loss of 63 cm$^3$. The water losses were measured in accordance with the method of API under normal conditions (20° C.) and after storage at 200° C. for 15 hours. The results are contained in Table I.

Example 2

In each case 2% of the additives A–E are added to samples of a drilling mud containing 4% of bentonite, 10% of sodium chloride and 10% of calcium chloride. Without the additives, the water loss of the drilling sludge is 72 cm$^3$. The test is carried out according to Example 1. The results are contained in Table II.

TABLE I

Test results
WATER LOSS ACCORDING TO API, in cm$^3$

| Additives | under normal conditions | | after ageing | |
| | a | b | a | b |
| --- | --- | --- | --- | --- |
| A | 8.5 | 9.0 | 8.8 | 10.4 |
| B | 8.3 | 6.6 | 9.1 | 8.1 |
| C | 9.0 | 8.8 | 9.2 | 46 |
| D | 9.2 | 14.0 | 12.0 | 44 |
| E | 8.9 | 7.4 | 9.3 | 30 | a = drilling muds containing water which is virtually free from electrolytes
b = drilling muds containing 25% of sodium chloride and 1% of gypsum

TABLE II

WATER LOSS ACCORDING TO API, in cm$^3$

| Additives | under normal conditions | after ageing |
| --- | --- | --- |
| A | 4.8 | 5.5 |
| B | 4.5 | 5.4 |
| C | 100 | 100 |
| D | 8.5 | 21.6 |
| E | 27 | 100 |

The test results show the superiority of the compounds A and B according to the invention compared with the previously known drilling mud additives, C, D and E which are stable at high temperatures. Table I demonstrates the approximate equivalence in drilling muds based on water which is virtually free from electrolytes. The higher effectiveness of A and B is clearly found in saline drilling sludges. The superiority of the copolymers A and B according to the invention is particularly great when the drilling muds also contain calcium chloride in addition to sodium chloride, as in Example 2. In this case, compounds C and E failed to be effective because of their sensitivity towards calcium ions, whilst copolymer D is not as effective as copolymers A and B according to the invention.

What is claimed is:

1. An aqueous drilling mud containing 0.5 to 40 kg/m$^3$ of a water-soluble copolymer consisting essentially of a random distribution of (a) 5 to 95% by weight of units of the formula

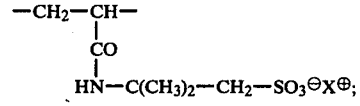

(b) 5 to 95% by weight of units of the formula

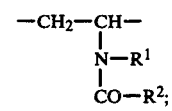

and
(c) 0 to 80% by weight of units of the formula

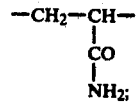
wherein
R¹ and R² are the same or different and each is hydrogen, methyl or ethyl; and
X⊕ is a cation.
2. In the process of well drilling using a drilling mud, the improvement which comprises circulating in said well while drilling the drilling mud according to claim 1.
* * * * *